United States Patent Office 3,148,155
Patented Sept. 8, 1964

3,148,155
REMOVAL OF METAL POISONS FROM CATALYSTS
Albert B. Schwartz, Philadelphia, Pa., assignor to Socony Mobil Oil Company, Inc., a corporation of New York
No Drawing. Filed Dec. 29, 1959, Ser. No. 862,461
6 Claims. (Cl. 252—413)

This invention relates to a method for treating a catalytic composite useful in the conversion of higher boiling hydrocarbons to lower boiling hydrocarbons such as gasoline. More particularly, the present invention is concerned with a method for treating siliceous cracking catalysts poisoned by metal contaminants. The present invention is specifically directed to a method for treating siliceous cracking catalysts which have become poisoned during hydrocarbon conversion operations by the deposition thereon of minute amounts of metal which adversely affect the conversion activity and selectivity of such catalysts.

Siliceous cracking catalysts, including naturally occurring activated clays and synthetically prepared composites, have long been recognized as useful in catalytically promoting hydrocarbon conversion reactions. Such siliceous catalysts contain silica and one or more metal oxides. In the clays used for cracking catalysts, the metal oxide present is predominately alumina. Active synthetic cracking catalysts are generally gels or gelatinous precipitates and include silica-alumina, silica-zirconia, silica-beryllia and silica-magnesia, as well as ternary combinations such as silica-alumina-zirconia, silica-alumina-beryllia and silica-alumina-magnesia. Ordinarily, this type of catalyst contains silica and at least one material selected from the group alumina, zirconia, beryllia, and magnesia. Other metal oxides may also be present, if desired, generally in small percentage, such as those of manganese, chromium, titanium, tungsten, molybdenum, and calcium. Synthetic siliceous cracking catalysts may be preapred by various well known methods such as by cogelation or coprecipitation of the silica and metal oxide, or by milling together the separately precipitated or gelled components. Alternatively, the metal oxide may be combined with a previously formed siliceous gel utilizing impregnation or base-exchange techniques. The present invention, however, is not limited to catalyst prepared by any particular method but is of general application to siliceous cracking catalysts. It will thus be understood that the catalysts undergoing treatment in accordance with the present invenion may be any of the siliceous cracking catalysts heretofore customarily employed, which are susceptible to poisoning by the presence of at least one metal contaminant selected from the group consisting of nickel, vanadium, and copper. It will further be understood that the treatment described herein may be performed on metal-poisoned catalysts before the same have been used in hydrocarbon conversion or on metal-poisoned catalysts which have been previously utilized in promoting the conversion of hydrocarbons.

Commercial catalytic cracking is carried out by contacting a hydrocarbon charge in the vapor or liquid state with a catalyst of the foregoing type under conditions of temperature, pressure and time to achieve substantial conversion of the charge to lower boiling hydrocarbons. The cracking reaction results in deposition of a carbonaceous deposit commonly called "coke" with consequent decline in catalytic activity of the catalyst. Under conditions to obtain efficient operation from a yield standpoint, it is found desirable to terminate the cracking reaction after a relatively short conversion run, for example, of from 5 to 15 minutes on stream, and thereafter to restore the activity of the catalyst by burning off the coke in a regeneration stage. The formation of coke represents a net loss, since hydrocarbons are consumed in its production. In addition, it is apparent that the greater the coke deposit, the longer the regeneration period would have to be in proportion to the on-stream period in order not to exceed detrimental temperature levels during regeneration.

Minute amounts of metals such as nickel, vanadium and copper are highly detrimental to the efficiency of the siliceous cracking catalysts above described. Such catalysts, contaminated even with an extremely small amount of such a metal, exhibit decreased activity and excessive coke formation during cracking reactions. Moreover, since the major portion of the catalyst remains in the cracking system over an extended period of time with recirculation, the amount of metal contaminant gradually builds up to such a point that further contact of the cracking charge with the catalyst becomes an uneconomical operation. The metal contaminant may be introduced during preparation of the catalyst, or it may be introduced with the charge stock, or it may be eroded from the equipment. Regardless of its manner of introduction, the presence of nickel, vanadium, or copper contaminant in the siliceous cracking catalyst employed is definitely detrimental, leading to the production of an excessive amount of coke.

The poisoning effects of minute amounts of the above metals on siliceous cracking catalysts have heretofore been recognized in the art. Various techniques have been suggested to remove the metal contaminant. In general, such techniques have involved rather drastic measures. In some instances, excessive heat treatment has been suggested for removing the metal contaminant despite the danger of surface destruction in the catalyst due to sintering.

It is a major object of this invention to overcome the difficulties caused by the poisoning effects of metal contaminant on the conversion efficiency of siliceous cracking catalysts. A more specific object is the provision of a method for reducing excessive coke formation on siliceous cracking catalysts contaminated with minute amounts of nickel, vanadium, or copper. A further object is to provide a process for effecting removal of metal poisons from siliceous cracking catalysts without impairing the desired conversion characteristics of such catalysts.

The above and other objects which will be apparent to those skilled in the art are achieved by the process described herein. Broadly, the present invention involves treating a metal-poisoned siliceous cracking catalyst with an aqueous solution of sulfurous acid, a water-soluble salt of sulfurous acid or a water-soluble salt of hyposulfurous acid. Such treatment, under conditions set forth hereinafter, has been discovered to afford a surprisingly low coke-forming catalyst. It has further been discovered that the removal of metal poisons from the catalyst is facilitated by inclusion in the treating solution of an agent which forms a complex with the metal which is to be removed.

The catalysts treated in accordance wth the present invention include both synthetic and activated naturally occurring composites containing a major proportion of silica and a minor proportion of one or more metal oxides as described above. The catalysts treated in accordance with the present process are further characterized by the presence therein of a small amount of metal contaminant, such as nickel, vanadium, or copper. It is contemplated that such catalysts contaminated with one or more of the above metals up to the extent of about 0.25 percent by weight total metal contaminant may be effectively treated in accordance with the present invention.

In practice of the invention, a metal-poisoned siliceous cracking catalyst is treated with an aqueous solution of sulfurous acid, a water-soluble salt of sulfurous acid or a water-soluble salt of hyposulfurous acid. Treatment may be carried out in any feasible manner and generally by contacting the poisoned catalyst with an aqueous solution containing at least one of the above type compounds. The treatment may be carried out batchwise, in which case the catalyst is permitted to remain in contact with the treating solution under generally static conditions for a predetermined length of time and is then removed therefrom, water-washed, dried and calcined. Treatment may also be carried out in a continuous manner by, for example, withdrawing a side stream of regenerated catalyst from a commercial catalytic cracking unit in an amount corresponding to about 0.3–5% of total catalyst inventory per day, conducting such side stream of catalyst to a treating drum wherein it is contacted with an aqueous solution of sulfurous acid, water-soluble salt of sulfurous acid or water-soluble salt of hyposulfurous acid. The drum is of sufficient size to permit a catalyst residence time within the approximate range of 2 to 48 hours. The drum is suitably revolved to maintain the catalyst in an agitated state. The treating solution may flow either current or counter-current to the catalyst flow through the drum. After being treated, the catalyst is conducted to a second drum wherein it is washed with water. The washed treated catalyst thereafter flows to a conduit where it is mixed with sufficient hot catalyst from the kiln of the catalytic cracking unit to vaporize the water therefrom. The catalyst mixture is then reintroduced into the cracking unit.

The amount of treating agent employed and the conditions under which treatment is carried out are such as to effect removal from the catalyst of metal contaminant thereby improving the cracking characteristics of the catalyst, as indicated by an increase in the gasoline-to-coke ratio. Generally, the treating agent will be employed in the form of an acidic aqueous solution containing between about 0.5 and about 10 percent by weight of treating agent based on the weight of the catalyst. The time of treatment is generally within the approximate range of 2 to 48 hours and preferably 6 to 30 hours depending on the nature and amount of metal contaminant which it is desired to remove. The temperature at which contact between poisoned catalyst and treating solution is carried out is also a factor affecting the time of treatment. As a practical matter, such temperature is above the freezing point of the treating solution. Generally, the temperature of treatment is above approximately 60° F. but below the boiling point of the treating solution. It has been found that agitation of the catalyst while in contact with the treating solution is desirable in reducing the content of metal contaminant.

The treating agent employed in the present method is selected from the group consisting of sulfurous acid, water-soluble salts of sulfurous acid and water-soluble salts of hyposulfurous acid. Preferably, the water-soluble salts of sulfurous acid include the ammonium, and alkali metal salts and more particularly ammonium sulfite, ammonium acid sulfite, sodium sulfite, sodium acid sulfite, lithium sulfite, potassium acid sulfite, and potassium sulfite. Of the water-soluble salts of hyposulfurous acid, zinc and sodium hyposulfite being most readily available are preferred. Hyposulfurous acid, itself, is too unstable to be prepared in the pure state. It will, of course, be understood that the metal salt of sulfurous or hyposulfurous acid utilized is such as not to adversely affect the catalytic properties of the catalyst so treated.

In a preferred embodiment of the invention, a complexing agent is included in the treating solution. The addition to the treating solution of an agent which will complex with the metal to be removed has been found to increase the effectiveness of such solution for removal of the metal contaminant. The particular complexing agent or agents employed are selected consistent with the metals which are to be removed. Representative complexing agents for inclusion in the treating solution utilized for removing nickel, vanadium and/or copper contaminant from siliceous cracking catalysts are ammonia, cyanides, amines, hydroxycarboxylic acids and water-soluble salts thereof, polyhydric alcohols, sugar acids, phytic acid and ethylene diamine tetra acetic acid and water-soluble salts thereof. The amount of complexing agent used is within the approximate range of 0.1 to 3 percent by weight of the catalyst treated.

After treatment, the catalyst is washed with water until free of soluble matter. The catalyst is then dried and calcined at a temperature within the approximate range of 500 to 1500° F. The catalyst so treated is in a reactivated state and may be introduced or returned to the conversion chamber of the cracking unit for further use in catalytically promoting the conversion of higher boiling hydrocarbons to hydrocarbons boiling in the range of gasoline.

The following examples will serve to illustrate the process of the invention without limiting the same.

*Example 1*

A siliceous cracking catalyst containing approximately 90.85 percent $SiO_2$, 9 percent $Al_2O_3$ and 0.15 percent $Cr_2O_3$ was utilized in a compact moving bed catalytic cracking unit over a period of about one year for approximately 24 cycles per day of alternate conversion and regeneration for the cracking of a gas oil charge. The catalyst, after such use, was found to be poisoned and the poisoning effects were discovered to be due to the presence in the catalyst of minute amounts of metal contaminant including 160 p.p.m. of nickel, 110 p.p.m. of vanadium, and 10 p.p.m. of copper.

The above poisoned catalyst was treated by covering a 300 gram sample thereof with a treating solution consisting of water previously acidified with sulfuric acid to reduce the pH to about 4 and containing 1.0 percent by weight of zinc hyposulfite based on the weight of the catalyst at room temperature (approximately 70° F.) and permitting the solution to remain in contact with the catalyst for 24 hours. The catalyst was then removed from the treating solution, drained, and washed with water until free of soluble material. The washed catalyst was then dried and finally calcined at 1100° F.

*Example 2*

A sample of 300 grams of the poisoned catalyst described in Example 1 was contacted with a treating solution consisting of water previously acidified with sulfuric acid to reduce the pH to about 4 and containing 3.3 percent by weight of zinc hyposulfite based on the weight of the catalyst at a temperature of 180–220° F. and permitting the solution to remain in contact with the catalyst for 24 hours. The catalyst was then removed from the treating solution, drained, washed, dried and calcined as in Example 1.

*Example 3*

A sample of 300 grams of the poisoned catalyst described in Example 1 was contacted with a treating solution consisting of water previously acidified with sulfuric acid to reduce the pH to about 4 and saturated with sulfur dioxide at room temperature (approximately 70° F.). Contact between the catalyyst and treating solution was maintained for 24 hours. The catalyst was then removed from the treating solution, drained, washed, dried and calcined as in Example 1.

*Example 4*

Contact of the poisoned catalyst and treating solution was carried out as in Example 3 but at a temperature of 150° F.

*Example 5*

A sample of 300 grams of the poisoned catalyst described in Example 1 was contacted with a treating solution consisting of water saturated with sulfur dioxide and containing 1.0 percent by weight of tartaric acid is a complexing agent. Contact between the catalyst and treating solution was maintained with agitation for a period of 24 hours. The catalyst was then removed from the treating solution, drained, washed, dried and calcined as in Example 1.

The concentration of metal contaminant, i.e. nickel, vanadium and copper for each of the above treated catalysts was determined and the results, as well as the processing conditions employed in each instance are shown in the following table:

| Example | Treating Solution | Concentration (Percent Wt. of Catalyst) | Temp., °F. | pH | Metal Conc. on Catalyst, p.p.m. | | |
|---|---|---|---|---|---|---|---|
| | | | | | Ni | V | Cu |
| 1 | Zinc Hyposulfite (ZnS$_2$O$_4$) | 1.0 | Room Temp | 2.9 | 135 | 92 | 9 |
| 2 | do | 3.3 | 180–200 | 2.6 | 115 | 92 | 7 |
| 3 | Sulfurous Acid | Saturated With SO$_2$ | Room Temp | | 130 | 36 | 6 |
| 4 | do | do | 150 | | 130 | 65 | 6 |
| 5 | Sulfurous Acid and Tartaric Acid | SO$_2$ Saturated, 1.0% Tartaric Acid | Room Temp | | 135 | 29 | 5 |

It will be seen from the foregoing data that in every instance, a reduction in concentration of metal contaminant was achieved.

The catalyst of Example 4, after treatment, was evaluated for catalytic cracking characteristics in the Cat-D Test and compared with results obtained utilizing the untreated catalyst. In accordance with the above test, standard wide cut Mid-Continent gas oil, boiling in the range of about 480° F. to 95 percent at 950° F. and having a gravity of about 28.7° A.P.I. was preheated and passed through a bed of catalyst at a temperature of 875° F. and substantially atmospheric pressure and a space velocity of 1.5 volumes of oil per volume of catalyst per hour and for a period of 10 minutes.

The following results were obtained after steaming both the untreated and treated catalysts for 24 hours at 1100° F.:

| | Untreated Catalyst | Treated catalyst, Example 4 |
|---|---|---|
| Conversion, Percent Vol | 44.7 | 42.9 |
| C$_4$ free gasoline, 410° F. end point, Percent Vol | 33.2 | 32.7 |
| C$_4$'s, Percent Vol | 11.5 | 11.7 |
| Dry Gas, Percent Wt | 5.1 | 4.6 |
| Coke, Percent Wt | 3.2 | 2.3 |
| Gasoline/Coke | 10.4 | 14.2 |

It will be seen from the above results that the gas plus coke yield was reduced from 8.3 percent weight for the untreated catalyst to 6.9 per cent weight for the treated catalyst with approximately the same gasoline and C$_4$ yield. It will further be seen that the coke make for the treated catalyst was reduced approximately 28 percent by weight and the gasoline/coke ratio was increased approximately 36.5 percent as compared with the untreated catalyst.

It will be understood that the above description is merely illustrative of preferred embodiments of the invention of which many variations may be made by those skilled in the art without departing from the spirit thereof.

I claim:

1. A method for reactivating a siliceous cracking catalyst which has been poisoned by a small amount of at least one metal selected from the group consisting of nickel, vanadium and copper during the conversion of high boiling petroleum hydrocarbons to hydrocarbons boiling in the gasoline range which comprises contacting said catalyst with an aqueous solution containing between about 0.5 and about 10 percent by weight based on the catalyst of a treating agent selected from the group consisting of sulfurous acid, a water-soluble salt of sulfurous acid and a water-soluble salt of hyposulfurous acid, and between about 0.1 and about 3 percent by weight based on the catalyst of a complexing agent for forming a complex with said metal under the reaction conditions, maintaining contact between said catalyst and said solution at a temperature below the boiling point of said solution for a period of between about 2 and about 48 hours, thereafter removing the catalyst from contact with said solution, water washing the same free of soluble matter, and drying the treated catalyst.

2. A method for reactivating a siliceous hydrocarbon conversion catalyst poisoned by the contaminating effects of a small amount of at least one metal selected from the group consisting of nickel, vanadium, and copper which comprises contacting said catalyst with an aqueous solution containing between about 0.5 and about 10 percent by weight based on the catalyst of a treating agent selected from the group consisting of sulfurous acid, a water soluble salt of sulfurous acid and a water soluble salt of hyposulfurous acid, and between about 0.1 and about 3 percent by weight based on the catalyst of a complexing agent for forming a complex with said metal under the reactions conditions, maintaining contact between said catalyst and said solution while in an agitated state at a temperature below the boiling point of said solution for a period of between about 2 and about 48 hours, thereafter removing the catalyst from contact with said solution and drying the treated catalyst.

3. A method for reactivating a siliceous cracking catalyst which has been poisoned by a small amount, less than about 0.25 percent by weight of metal contaminant, which contaminant consists of at least one metal selected from the group consisting of nickel, vanadium and copper, which comprises contacting said catalyst with an aqueous solution containing between about 0.5 and about 10 percent by weight based on the catalyst of a treating agent selected from the group consisting of sulfurous acid, a water-soluble salt of sulfurous acid and a water-soluble salt of hyposulfurous acid, and between about 0.1 and about 3 percent by weight based on the catalyst of a complexing agent for forming a complex with said metal under the reactions conditions at a temperature below the boiling point of said solution for a period of between about 2 and about 48 hours, removing the catalyst from contact with said solution, water washing the same free of soluble matter, drying and calcining the treated catalyst at a temperature within the approximate range of 500 to 1500° F.

4. A continuous method for reactivating a siliceous cracking catalyst which has been poisoned by a small amount of at least one metal selected from the group consisting of nickel, vanadium and copper during the conversion at an elevated temperature of high boiling petroleum hydrocarbons to hydrocarbons boiling in the gasoline range which comprises withdrawing a stream of said catalyst from the main body thereof contained in a catalytic cracking unit, contacting said stream of catalyst with an aqueous solution containing between about 0.5 and about 10 percent by weight based on the catalyst of a treating agent selected from the group consisting of sulfurous acid, a water soluble salt of sulfurous acid and a water soluble salt of hyposulfurous acid, and between about 0.1 and about 3 percent by weight based on the catalyst of a complexing agent for forming a complex with said metal under the reactions conditions, maintaining contact between said catalyst and said solution at a temperature below the boiling point of said solution for a period of between about 2 and about 48 hours, removing the catalyst from contact with said solution, water washing the same free of soluble matter and returning the stream of washed catalyst to said cracking unit maintained at an elevated temperature.

5. A method for effecting removal from a siliceous hydrocarbon conversion catalyst of a small contaminating amount of a metal selected from the group consisting of nickel, vanadium and copper which comprises contacting said catalyst with a solution containing a treating agent selected from the group consisting of sulfurous acid, a water-soluble salt of sulfurous acid, a water-soluble salt of hyposulfurous acid and between about 0.1, and about 3 percent by weight based on the catalyst of a complexing agent for forming a complex with said metal upon said metal entering into said solution.

6. The method of claim 5 wherein said catalyst is a silica-alumina composite, and wherein said complexing agent is selected from the group consisting of ammonia, cyanides, amines, hydroxy carboxylic acids, water-soluble salts thereof, polyhydric alcohols, sugar acids, phytic acid, and ethylene diamine tetra acetic acid, and water-soluble salts thereof.

References Cited in the file of this patent

UNITED STATES PATENTS

| | | |
|---|---|---|
| 783,600 | Waterbury | Feb. 28, 1905 |
| 2,494,556 | Hornaday | Jan. 17, 1950 |
| 2,668,798 | Plank | Feb. 9, 1954 |